United States Patent [19]

Paelke

[11] Patent Number: 4,580,677
[45] Date of Patent: Apr. 8, 1986

[54] BELT CONVEYOR FOR STEEP OR VERTICAL CONVEYANCE

[76] Inventor: Jürgen Paelke, An der Este 13, D-2117 Tostedt, Fed. Rep. of Germany

[21] Appl. No.: 498,194
[22] PCT Filed: Aug. 23, 1982
[86] PCT No.: PCT/EP82/00179
§ 371 Date: May 12, 1983
§ 102(e) Date: May 12, 1983
[87] PCT Pub. No.: WO83/01055
PCT Pub. Date: Mar. 31, 1983

[30] Foreign Application Priority Data

Sep. 14, 1981 [DE] Fed. Rep. of Germany ....... 3136338

[51] Int. Cl.$^4$ ............................................ B65G 15/14
[52] U.S. Cl. .................... 198/626; 198/605; 198/640
[58] Field of Search .............. 198/626, 604, 605, 607, 198/640, 641, 703

[56] References Cited

U.S. PATENT DOCUMENTS 1,080,501 12/1913 Tibyrica ............................ 198/605
3,881,590 5/1975 Hartmann ..................... 198/703 X
4,273,238 6/1981 Blattermann et al. .............. 198/605

FOREIGN PATENT DOCUMENTS 1134027 2/1963 Fed. Rep. of Germany .
2519447 11/1976 Fed. Rep. of Germany ...... 198/605
2717100 10/1978 Fed. Rep. of Germany ...... 198/607
2930957 2/1981 Fed. Rep. of Germany ...... 198/626
797097 6/1953 United Kingdom ................ 198/626

Primary Examiner—Joseph E. Valenza
Assistant Examiner—Michael Stone
Attorney, Agent, or Firm—Milton M. Field

[57] ABSTRACT

Figure 1:
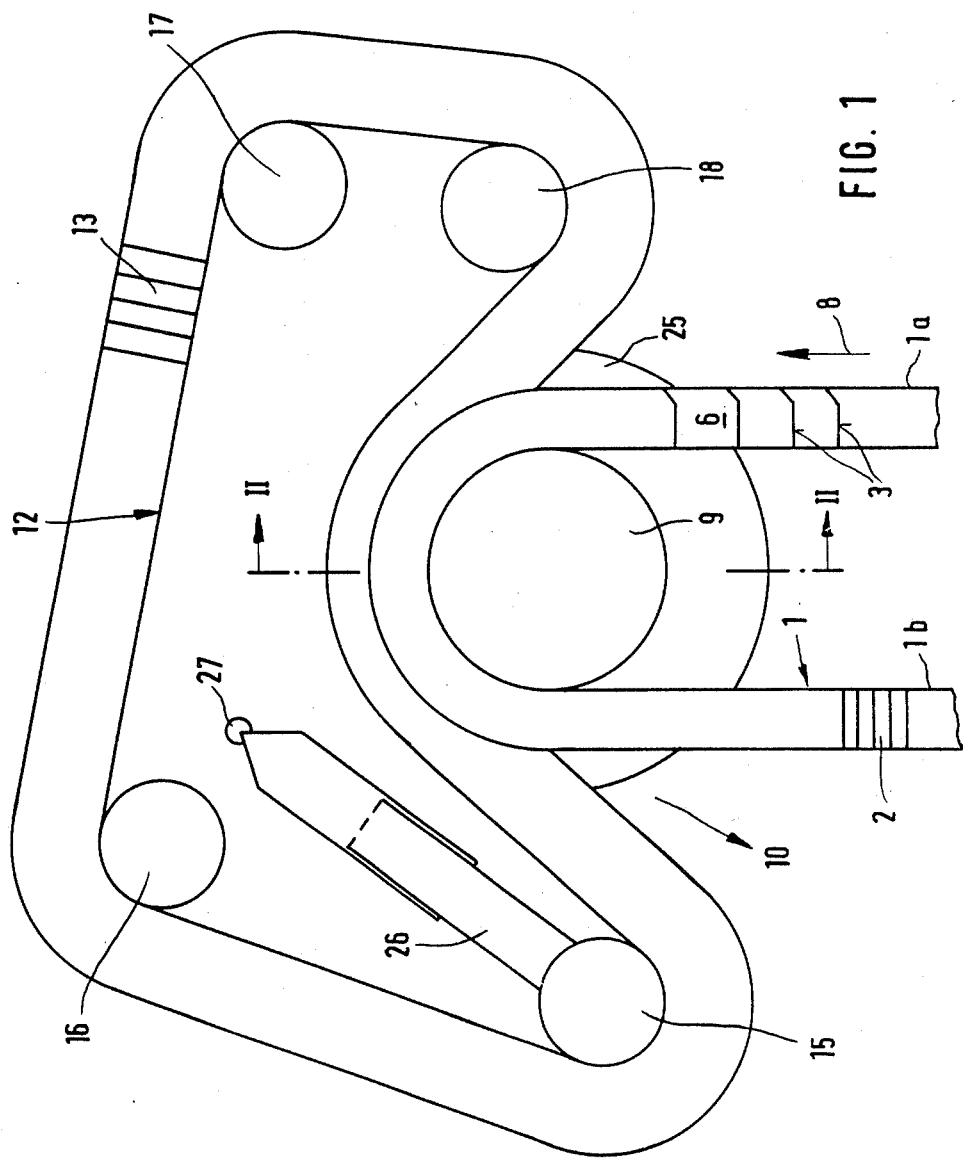

A belt conveyor for steep or vertical conveyance of bulk material has a conveyor belt (1) of the type having corrugated side walls which travels upstream and downstream of the upper discharge end drum (9) along a steep incline or in the vertical direction, that is, there is no additional deflection means at the upper end of the conveying track. In order to avoid the random discharge of bulk material which would normally occur with that type of guidance, on account of centrifugal forces, particularly when operating with higher conveying speeds, the discharge drum (9) has associated with it a covering means in the form of a follower cover belt (12) with corrugated side walls (13) fitted thereto at its sides, which cover belt (12) is overlying the corrugated side walls (2) of the conveyor belt (1) within the deflection zone around the discharge drum (9), and which, downstream of the discharge drum (9), leaves the return end (16) of the conveyor belt (1) while forming with the latter an acute angle which preferably is adjustable in size. At the point where the cover belt (12) separates from the conveyor belt (1), the bulk material is delivered in an orderly discharge parabola (10) which is controllable by altering the acute angle (FIG. 1). The cover belt may be driven with a different linear velocity than the conveyor belt.

11 Claims, 2 Drawing Figures

BELT CONVEYOR FOR STEEP OR VERTICAL CONVEYANCE

The object of the present invention is a belt conveyor to be used for steep or vertical conveyance of bulk material.

A belt conveyor of this type can be designed as a so-called L-conveyor wherein the carrier end of the conveyor belt runs horizontally or at a slight incline through a section for loading the bulk material and then rises steeply or in a vertical direction from a deflecting arrangement after the loading point towards a discharge drum situated above it, while the return end runs parallel or at least generally parallel to the carrier end. The guard cover provided for the discharge drum, which in known belt conveyors is designed as a stationary device, for example in the form of a baffle box, should prevent a scattering of the bulk material at the discharge drum and should ensure a relatively orderly discharge parabola. However, at high conveying speeds—and only such speeds make economic sense with higher conveying output—known guard covers, in any case, fail to function as expected when the conveyance is rather steep or vertical due to the high centrifugal forces that bear upon the bulk material at the discharge drum. For this reason, so-called L-conveyors have not been successful in practice for such applications.

A certain improvement of the bulk material discharge is achieved with so-called S-conveyors wherein the carrier end, after a second deflection at the upper end of the steep or vertical conveying track, runs generally horizontally towards the discharge drum. However, S-conveyors of this kind are far more expensive to construct than L-conveyors because of the second deflection of the carrier end and the corresponding further deflection also for the return end. In addition, there is the particular disadvantage that the calculation of strength for the conveyor belt may in principle be based only on the edge areas of the conveyor belt. This is due to the concave deflection of the return end of the conveyor belt as it leaves the discharge drum from the horizontal into a steep or vertical downward direction. In view of the fact that the respective deflection means can engage the conveyor belt only at a narrow area along its edges outwardly of its corrugated side walls or, at most, upon the top thereof, the entire tension load applied to the conveyor belt at the deflection means is practically distributed over only its two edge areas and as a result a considerably higher tensile stress occurs in those areas than if there were an even distribution of the tension load over the entire width of the conveyor belt. However, since the conveyor belt is to be rated over its entire width for the highest tensile stress possible, there exists a need for a conveyor belt whose entire loading capacity is greater than that which would be actually required for any specified conveying capacity.

Accordingly, it is the aim of the present invention to provide a belt conveyor for steep or vertical conveyance of bulk material which ensures, despite high conveying speeds, an orderly, practically scatter-free bulk material discharge at the discharge drum at a minimum construction cost as compared to the S-conveyor and without the necessity of providing an "oversized" conveyor belt.

In the belt conveyor according to the present invention, the guard cover associated with the discharge drum, is designed as a cover belt such that even with vertical motion of the conveyor belt's carrier and return ends on either side of the discharge drum, an orderly, practically scatter-free bulk material discharge takes place at the discharge drum. As a result, it is for the first time possible in practice to utilize the structural advantages of the so-called L-conveyor for the steep and vertical conveyance of bulk material, including the particularly significant advantage of being able to do with a conveyor belt sized to just meet the conveying capacity needed. The cover belt according to the concept of the present invention need be applied to the conveyor belt only within the deflection zone of the discharge drum, that is, not in the actual conveying track as well. Its function is to catch loose particles which are in a way prematurely thrown off from the bulk material at the discharge drum through centrifugal force overcoming the force of gravity, and to guide them around the deflection drum over into the discharge parabola which, thereby, is formed between the return end of the conveyor belt running off from the discharge drum and the return end of the cover belt which leaves the deflection zone of the discharge drum. For this result, it is neither necessary that the cover belt rest in sealing fashion upon the corrugated side walls of the conveyor belt, nor that in the deflection zone of the discharge drum the downward projecting corrugated side walls of the cover belt be in contact with the conveyor belt or its corrugated side walls, although a mutual engagement of the cover and conveyor belts at their respective corrugated side walls is possible. Guiding the conveyor and cover belts without mutual engagement is very favorable to reducing wear, while mutual contact is recommended in case a particularly tight sealing is required, as where finely grained or dusty material is being conveyed.

A further particular advantage of the belt conveyor according to the present invention consists in that the discharge parabola of the bulk material is easily controllable in its shape, namely through the appropriate selection of the angle between the return end of the conveyor belt and the return end of the cover belt as it travels out of the deflection zone. Thus, one can easily allow for different conveying speeds, for instance, depending on the grain size of the bulk material conveyed. A suitable arrangement for control of the discharge parabola involves the use of a cover belt deflector drum which is adjustable in position by being mounted on a pivotable supporting arm of variable length.

The guidance of the cover belt within the deflection zone of the discharge drum is best accomplished by directing the cover belt for travel around two disk wheels, which are arranged on opposite sides of the discharge drum, are mounted separately on the same axis of rotation as the drum and may be rotatably coupled to the drum. As an alternative to the two disk wheels two rows of stub idlers may be provided which would be particularly suitable for lighter or smaller belt conveyors according to the present invention. In either case, the cover belt moves with the same angular velocity as the discharge drum and, thus, because it is positioned at a greater distance from the axis of rotation, moves with a greater linear velocity than the corresponding adjacent portion of the conveyor belt. The cover belt may also be driven by its own driving means and may be driven at a different linear speed than the corresponding adjacent portion of the conveyor belt. In both cases, the cover belt functions to entrain the bulk material into the discharge parabola which is practically scatter free.

Figure 2:
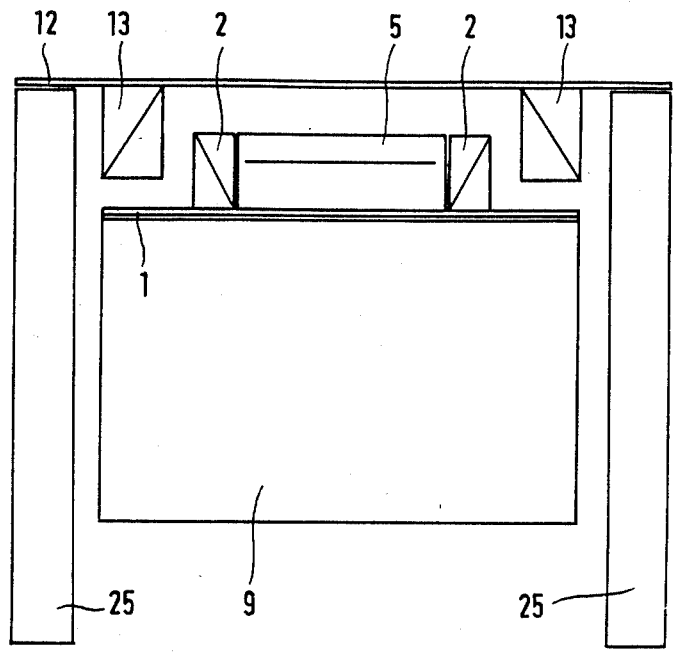

In the following, the present invention will be described in connection with a schematically illustrated embodiment. In the drawings, FIG. 1 is a partial view in side elevation of an L-type belt conveyor for vertical conveyance showing the upper end portion of the vertical conveying track and the follower cover belt; and FIG. 2 is a cross-section along line II—II of FIG. 1.

The belt conveyor for vertical conveyance of bulk material as shown in FIG. 1 operates with a conventional conveyor belt 1 made from rubber or the like which is equipped on its sides with two corrugated side walls 2 projecting generally perpendicularly from the conveyor belt, also as conventionally manufactured, and of which only one is shown diagrammatically in FIG. 1 and without representation of its corrugations. At regular intervals along its length, the conveyor belt 1 has fitted thereto transversely oriented angular cleats 5 which subdivide the space between the corrugated side walls into individual conveying spaces 6.

The embodiment shown refers to an L-type conveyor in which the conveyor belt with its carrier end 1a and also with its return end 1b is guided in a way not specifically shown through a section for loading of the material to be conveyed either horizontally or on a slight incline ascending in the conveying direction. Downstream of the material loading section, a vertical deflection of the carrier end 1a takes place so that the conveyor belt travels in a vertical direction towards an upper discharge drum 9. Thereat, it is deflected by 180 degrees and travels as the return end 1b likewise in a vertical direction away from the discharge drum 9. In this way, the bulk material is transported upwards in a conveying direction 8 up to the discharge drum 9 and is there dumped out at a discharge point 10.

Associated with the discharge drum 9 is a cover means in the form of a companion or follower cover belt 12. Cover belt 12 is likewise conventionally made from rubber or the like and is equipped with two corrugated side walls 13, also as conventionally manufactured, which project outwardly generally perpendicular to cover belt 12. FIG. 1 is a diagrammatical showing of only one of the corrugated side walls, without representing its corrugations. The endless cover belt 12 is guided by at least three or, as in the embodiment illustrated, by four cover belt deflector drums 15, 16, 17 and 18.

Between the deflector drums 18 and 15 within the deflection zone of discharge drum 9, cover belt 12 runs on two disk wheels, as shown in FIG. 2, which are positioned on opposite sides of discharge drum 9 and have the same axis of rotation as, but are separate from, the discharge drum. The disk wheels engage narrow border areas of the cover belt outwardly of its corrugated side walls 13. Disk wheels 25 are of a larger diameter than discharge drum 9 such that the distance between the conveuor belt 1 and cover belt 12 is greater than the height of corrugated side walls 13 of cover belt 12 and also greater than the height of corrugated side walls 2 and cleats 5 of conveyor belt 1. Moreover, the cover belt is so dimensioned that the distance between the inner edges of corrugated side walls 13 of cover belt 12, measured transversely to the direction of the cover belt, is greater than the distance between the outer edges of the corrugated side walls 2 on conveyor belt 1. By selecting a suitably lower position for the cover belt deflector drums 18 and 15, the guidance of the cover belt is such that it meets the carrier end 1a of the conveyor belt at an acute angle and also leaves the deflection zone of discharge drum 9 at an acute angle with respect to the return end 1b and to the vertical, respectively. In this way, the cover belt may be seen to be slipped over the conveyor belt within the deflection zone.

The discharge parabola of the conveyed bulk material at the discharge point 10 is formed between the vertical return end 1b and the straight portion of the cover belt which extends from the disk wheels 25 to the deflector drum 15. The direction of this discharge parabola may be adjusted in a simple manner by changing the position of cover belt deflector drum 15. To this end, deflector drum 15 is mounted at the free end of a pivotable lever 26 of variable length which is angularly moved around a pivot 27 for controlling the discharge parabola. In order to maintain cover belt 12 taut in any angular position, the lengthwise adjustable lever 26 is at all times urged by pressure, for example by means of an internal spring means, or an hydraulic fluid.

The cover belt has its own driving means, not specifically shown, such as an electric motor. If the speed of the cover belt is adjustable using the motor, it is also possible to vary the discharge parabola by selecting a different speed of the cover belt in relation to that of the conveyor belt. Alternatively, it is possible to dispense with a separate drive to the cover belt and to have it driven by the conveyor belt, either through direct frictional contact with the conveyor belt within the deflection zone of the discharge drum, or through coupling of the disk wheels to the discharge drum. Because the disk wheels position the cover belt at a greater distance from the rotational axis than the conveyor belt is positioned by the discharge drum, when the disk wheels are coupled for rotation with the discharge drum and thus have the same angular velocity, the cover belt has a higher linear velocity than the conveyor belt.

Instead of the disk wheels, a row of stub idlers may be arranged in a manner not specifically shown in accordance with the path of movement of the cover belt within the deflection zone of the discharge drum. Like the disk wheels, the stub idlers would engage with edge areas of the cover belt 12, outwardly of the corrugated side walls 13.

I claim:

1. A high speed belt conveyor for steep or vertical conveyance of bulk material comprising a conveyor belt having fitted thereto, at its sides, corrugated side walls and carrying angular cleats of elastomeric material spaced along the length of said conveyor belt and disposed transversely to said side walls, said conveyor belt extending through a deflection zone around an upper discharge drum whereat said bulk material is discharged from said conveyor belt in a discharge parabola, in which upstream and downstream of said upper discharge drum said conveyor belt is guided in a steep or vertical path and means is provided for covering said conveyor belt in said deflection zone of the discharge drum, characterized in that said covering means comprises a follower cover belt (12) having fitted thereto, at its sides, corrugated side walls (13), and said cover belt overlying the corrugated side walls (2) and the cleats (5) of said conveyor belt (1) within the deflection zone of said discharge drum (9), in that the distance between the inner edges of said corrugated side walls (13) of said cover belt (12), as measured transversely to the lengthwise direction of the cover belt, is greater than the corresponding distance between the outer edges of said corrugated side walls (2) of said conveyor belt (1), in that downstream of said discharge drum (9) said cover belt (12) is guided over a portion of its path of movement in a manner to form an acute angle with the vertical, in that said cover belt (12) within the area of discharge drum (9) is supported by support means independently of said discharge drum (9), said support means being dimensioned to maintain the distance between said conveyor belt (1) and said cover belt (12) within said deflection zone greater than the height of said corrugated side walls (2) and said cleats (5) on said conveyor belt (1), and in that said discharge drum (9) and said cover belt are driven by separate drive means so that said cover belt (12) is driven at a speed different from the speed at which said conveyor belt (1) is driven, whereby said cover belt (12) moves with greater linear velocity than the corresponding adjacent portion of said conveyor belt (1) so as to entrain said bulk material into said discharge parabola, said discharge parabola being practically scatter free.

2. A belt conveyor according to claim 1, characterized in that within the deflection zone of said discharge drum (9), said cover belt (12) is guided in a path parallel to said conveyor belt (1).

3. A belt conveyor according to claim 1, characterized in that the size of said acute angle is adjustable.

4. A belt conveyor according to claim 3, characterized in that said cover belt (12) travels from said discharge drum (9) to a cover belt deflector drum (15) which is adjustable in position.

5. A conveyor belt according to claim 4, characterized in that said cover belt deflector drum (15) is mounted on a pivotable supporting arm (26) of variable length which is biased to maintain a maximum length.

6. A high speed belt conveyor for steep or vertical conveyance of bulk material comprising a conveyor belt having fitted thereto, at its sides, corrugated side walls and carrying angular cleats of elastomeric material spaced along the length of said conveyor belt and disposed transversely to said side walls, said conveyor belt extending through a deflection zone around an upper discharge drum whereat said bulk material is discharged from said conveyor belt in a discharge parabola, in which upstream and downstream of said upper discharge drum said conveyor belt is guided in a steep or vertical path and means is provided for covering said conveyor belt in said deflection zone of the discharge drum, characterized in that said covering means comprises a follower cover belt (12) having fitted thereto, at its sides, corrugated side walls (13), and said cover belt overlying the corrugated side walls (2) and the cleats (5) of said conveyor belt (1) within the deflection zone of said discharge drum (9), in that the distance between the inner edges of said corrugated side walls (13) of said cover belt (12), as measured transversely to the lengthwise direction of the cover belt, is greater than the corresponding distance between the outer edges of said corrugated side walls (2) of said conveyor belt (1), in that within the deflection zone of said discharge drum (9) said cover belt (12) travels around two disk wheels (25), said disk wheels (25) being dimensioned to maintain the distance between said conveyor belt (1) and said cover belt (1) within said deflection zone greater than the height of said corrugated side walls (2) and said cleats (5) on said conveyor belt (1), and in that said discharge drum (9) and said disk wheels (25), arranged on opposite sides thereof, are mounted separately on the same axis of rotation and are rotatably coupled, whereby said cover belt (12) moves with greater linear velocity than the corresponding adjacent portion of said conveyor belt (1) so as to entrain said bulk material into said discharge parabola, said discharge parabola being practically scatter free.

7. A belt conveyor according to claim 6, characterized in that the size of said acute angle is adjustable.

8. A belt conveyor according to claim 7, characterized in that said cover belt (12) travels from said discharge drum (9) to a cover belt deflector drum (15) which is adjustable in position.

9. A conveyor belt according to claim 8, characterized in that said cover belt deflector drum (15) is mounted on a pivotable supporting arm (26) of variable length which is biased to maintain a maximum length.

10. A high speed belt conveyor for steep or vertical conveyance of bulk material comprising a conveyor belt having fitted thereto, at its sides, corrugated side walls and carrying angular cleats of elastomeric material spaced along the length of said conveyor belt and disposed transversely to said side walls, said conveyor belt extending through a deflection zone around an upper discharge drum whereat said bulk material is discharged from said conveyor belt in a discharge parabola, in which upstream and downstream of said upper discharge drum said conveyor belt is guided in a steep or vertical path and means is provided for covering said conveyor belt in said deflection zone of the discharge drum, characterized in that said covering means comprises a follower cover belt having fitted thereto, at its sides, corrugated side walls, and said cover belt overlying the corrugated side walls and the cleats of said conveyor belt within the deflection zone of said discharge drum, in that the distance between the inner edges of said corrugated side walls of said cover belt, as measured transversely to the lengthwise direction of the cover belt, is greater than the corresponding distance between the outer edges of said corrugated side walls of said conveyor belt, in that within said deflection zone of said discharge drum means are provided to maintain the distance between said conveyor belt and said cover belt greater than the height of said corrugated side walls and said cleats on said conveyor belt, in that downstream of said discharge drum said cover belt is guided over a portion of its path of movement in a manner to form an acute angle with the vertical, and in that within the deflection zone of said discharge drum said cover belt is driven at a greater linear velocity than the corresponding adjacent portion of said conveyor belt so as to entrain said bulk material into said discharge parabola, said discharge parabola being practically scatter free.

11. A belt conveyor according to claim 10, wherein said means to maintain the distance between said conveyor belt and said cover belt engages the inside of the curve of said cover belt facing said conveyor belt and said discharge drum.

* * * * *